(12) United States Patent
Brück et al.

(10) Patent No.: US 6,558,832 B1
(45) Date of Patent: May 6, 2003

(54) FUEL CELL MODULE

(75) Inventors: Rolf Brück, Bergisch Gladbach (DE); Andree Bergmann, Lohmar (DE); Jörg-Roman Konieczny, Siegburg (DE)

(73) Assignee: Emitec Gesellschaft fur Emissionstechnologie mbH, Lohmar (DE)

( * ) Notice: Subject to any disclaimer, the term of this patent is extended or adjusted under 35 U.S.C. 154(b) by 243 days.

(21) Appl. No.: 09/699,586

(22) Filed: Oct. 30, 2000

Related U.S. Application Data

(63) Continuation of application No. PCT/EP99/02922, filed on Apr. 29, 1999.

(30) Foreign Application Priority Data

Apr. 30, 1998 (DE) ......................... 198 19 291

(51) Int. Cl.[7] .............. H01M 2/00; H01M 2/02; H01M 8/00; H01M 2/14
(52) U.S. Cl. .................. 429/34; 429/12; 429/13; 429/38
(58) Field of Search .................. 429/32, 33, 34, 429/38, 39, 12, 13

(56) References Cited

U.S. PATENT DOCUMENTS

| | | | | |
|---|---|---|---|---|
| 4,997,726 A | * | 3/1991 | Akiyama et al. ............. | 429/30 |
| 5,268,241 A | * | 12/1993 | Meacham ..................... | 429/35 |
| 5,480,738 A | * | 1/1996 | Elangovan et al. ........... | 429/32 |
| 5,527,634 A | * | 6/1996 | Meacham ..................... | 429/35 |
| 5,589,286 A | * | 12/1996 | Iwata .......................... | 429/30 |
| 5,856,035 A | * | 1/1999 | Khandkar et al. ............. | 429/32 |
| 6,054,228 A | * | 4/2000 | Cisar et al. ................... | 429/18 |

FOREIGN PATENT DOCUMENTS

| | | |
|---|---|---|
| DE | 195 02 391 C1 | 5/1996 |
| DE | 195 39 959 A1 | 5/1996 |
| DE | 196 24 887 A1 | 1/1997 |
| JP | 04 206 162 | 7/1992 |

* cited by examiner

*Primary Examiner*—Carol Chaney
*Assistant Examiner*—Donald V. Scaltrito
(74) *Attorney, Agent, or Firm*—Laurence A. Greenberg; Werner H. Stemer; Ralph E. Locher

(57) ABSTRACT

A fuel cell module containing at least two fuel cells, especially low-temperature fuel cells, is described. Each fuel cell has two electrodes of different polarity as well as an electrolyte positioned between the electrodes. Each fuel cell is supplied with fuel via a fuel supply channel and with an oxidant via an oxidant supply channel. The fuel cells are substantially juxtaposed. The electrodes of different polarity are electrically connected with each other. The electrolytes of each cell are situated essentially in the same plane. Several fuel cells connected in series constitute a string or row and several strings can be connected in parallel.

24 Claims, 4 Drawing Sheets

FUEL CELL MODULE

CROSS-REFERENCE TO RELATED APPLICATION

This is a continuation of copending International Application PCT/EP99/02922, filed Apr. 29, 1999, which designated the United States.

BACKGROUND OF THE INVENTION

Field of the Invention

The subject matter of the patent application relates to a fuel cell module having at least two fuel cells, in particular low-temperature fuel cells.

It is known that electrical energy can be produced by so-called fuel cells. The fuel cells, or a large number of fuel cells that form a fuel cell module, can be used as a mobile, a stationary or a local power supply. It is already known for fuel cells to be used in motor vehicles, as is described, for example, in German Patent DE 43 22 765 C1.

So-called low-temperature fuel cells, which operate at a temperature of about 80° C., are used in the area of motor vehicle technology. A fuel cell has two electrodes of different polarities. An electrolyte is disposed between the electrodes. The electrolyte in a low-temperature fuel cell may, for example, be a proton-conducting electrolyte membrane (PEM). The fuel cell is fed with a fuel, in particular hydrogen or methanol, and an oxidant, in particular oxygen, separately from one another. In the PEM fuel cell, the positive hydrogen ions, that is to say the protons, migrate through the electrolyte membrane. On the opposite side of the electrolyte membrane, the hydrogen ions react with oxygen. The excess electrons on the hydrogen side of the membrane and the shortage of electrons on the oxygen side produce a potential difference. If an external circuit is formed, then a current can flow.

It is known for a fuel cell module to contain at least two fuel cells, which are separated from one another by a so-called bipolar plate. The fuel cells are in this case disposed such that the anode of one fuel cell is connected via the bipolar plate to a cathode of an adjacent fuel cell. The individual fuel cells in a fuel cell module are electrically connected in series. Apart from providing the electrical connection between the cathode and the anode of adjacent fuel cells, the bipolar plate is also used to separate the fuel and the oxidant. The bipolar plate may be formed by two corrugated metal sheets which are disposed one above the other and between which a smooth metal sheet is disposed. Together with the smooth metal sheet, the corrugated metal sheets bound channels through which the fuel or the oxidant is passed. The fuel and the oxidant preferably flow in directions approximately at 90° to one another.

Bipolar plates are also known which are of integral construction and have channels for the fuel and the oxidant.

The fuel cells in such a stack are mechanically stressed with respect to one another, with the aim of ensuring that there are no gas leaks even at the operating temperature of the fuel cell module. To this end, the fuel cells are disposed between two plates, which are connected to one another via tie rods.

The electrical losses in the fuel cell module are also governed by the electrical connection between the electrodes and the bipolar plate.

SUMMARY OF THE INVENTION

It is accordingly an object of the invention to provide a fuel cell module which overcomes the above-mentioned disadvantages of the prior art devices of this general type, in which the electrical losses in the fuel cell module are reduced.

With the foregoing and other objects in view there is provided, in accordance with the invention, a fuel cell module formed of at least two fuel cells. Each of the fuel cells has two electrodes of different polarities and an electrolyte disposed between the electrodes. The electrodes of different polarities are electrically connected to one another. The fuel cells are disposed substantially alongside one another and the electrolyte in each of the fuel cells is disposed substantially in a common plane. At least one fuel supply channel fluidically communicating with the fuel cells and at least one oxidant supply channel fluidically communicating with the fuel cells are provided.

The fuel cell module according to the invention has at least two fuel cells, in particular low-temperature fuel cells, preferably fuel cells with a proton-conducting electrolyte membrane. Each of the fuel cells has two electrodes of different polarities and an electrolyte disposed between the electrodes. At least one fuel supply channel is provided for supplying the fuel cells with a fuel. Each fuel cell is connected to at least one oxidant supply channel, to provide an oxidant.

The electrodes of different polarity in the fuel cell module according to the invention are electrically connected to one another. The at least two fuel cells are disposed essentially alongside one another. The fuel cells are disposed in such a way that the electrolytes in each cell essentially lie in a common plane. This configuration of the fuel cell module according to the invention makes it possible to dispense with bipolar plates, as they are known in a fuel cell module according to the prior art. The individual fuel cells are electrically connected via a connecting element. The electrical losses in the fuel cell module are less than those in a fuel cell module as is known from the prior art, since the electrical contact between the electrodes and the connecting elements is independent of the contact pressure. The electrical contact between the connecting elements and the respective electrodes can be provided, for example, by soldering.

One advantageous refinement of the fuel cell module according to the invention proposes that the fuel cells are disposed alternately such that the electrodes of different polarity in adjacent fuel cells essentially lie in a common plane. This refinement of the fuel cell module according to the invention results in a reduction in the length of the connecting elements which connect the electrodes of different polarity, so that the resistive losses of the connecting elements are reduced, with the connecting element having the same cross-sectional size.

Yet another advantageous refinement of the fuel cell module proposes that the at least two fuel cells are disposed essentially alongside one another, preferably directly alongside one another, and form a row.

A fuel cell module preferably has two rows. The rows of the fuel cell module are preferably connected in parallel. Each row should in this case be of the same voltage. This refinement of the fuel cell module makes it possible to vary the power of the fuel cell module for a predetermined voltage.

Yet another advantageous refinement of the fuel cell module proposes that at least two rows are disposed one above the other, such that they are electrically isolated from one another. This advantageous refinement results in the fuel cell module having a relatively compact construction. Such a configuration of the fuel cell module is particularly suitable for motor vehicles, since the space required for the fuel cell module is relatively small.

For a further compact construction of the fuel cell module, the invention proposes that the fuel cells are disposed essentially parallel to one another.

Depending on the available installation space, the fuel cell module may also be configured such that the fuel cells are disposed essentially on the circumference of a circle. Other configurations of the arrangement of the fuel cells are possible. It is not essential for all the fuel cells to be disposed parallel or on the circumference of a circle. The arrangement of the fuel cells in each row may be the same, so that fuel cell modules of different power can be produced easily and at low cost. It is not essential for the fuel cells in the individual rows to be disposed in the same way. The individual rows may also have a different number of fuel cells.

A further advantageous refinement of the fuel cell module according to the invention proposes that each fuel cell has a fuel feed channel and an oxidant feed channel. The fuel feed channels of the fuel cells are connected to the fuel supply channel, and the oxidant feed channels of the fuel cells are connected to the oxidant supply channel. The fuel cells are disposed between the fuel supply channel and the oxidant supply channel. The fuel cells can also be disposed directly, that is to say without any feed channels, between the fuel supply channel and the oxidant supply channel, so that the fuel and the oxidant are in direct contact with the electrodes. This configuration allows the fuel cells to be supplied with a fuel, in particular with hydrogen, via a fuel supply channel. The fuel, in particular the hydrogen, may be distributed controlled by diffusion. The hydrogen is preferably carried at a low pressure in the fuel supply channel. The hydrogen is transported to the electrode by diffusion. The hydrogen is not carried in the form of a flow through the fuel supply channel. The power of the fuel cell module is controlled via the power required by a load. The configuration of the fuel supply channel can also be used in different refinements, or in different types of refinements, of the fuel cell module.

An oxidant, in particular air, can also be fed via a single oxidant supply channel. Instead of an oxidant supply channel, the electrodes on the oxygen side may be freely accessible to the air from the outside. This refinement is independent of the configuration of the fuel cell module. The oxygen in the air can then be fed through a membrane to the electrodes on the oxygen side (the cathodes), when using a proton-conducting electrolyte membrane. Alternatively, a supply channel can be provided for the supply on the air side, if the supply of oxygen by diffusion is not sufficient.

The fuel cell module may also have a number of rows, so that the fuel cells in each row are also connected to the oxidant supply channel or to the fuel supply channel. This results in a central supply for the fuel cell module.

The power of the fuel cells, or the power of a row, is dependent inter alia on the available fuel. In order to control the power of the fuel cell module, it is proposed that each row has in each case one fuel supply channel and one oxidant supply channel. Each row can be actuated individually by feeding the fuel and oxidant separately.

According to a further advantageous refinement, the fuel cell module is preferably configured such that the fuel feed channels are essentially formed at right angles to the fuel supply channel.

The fuel cell module may also be configured essentially without any fuel feed channels or oxidant feed channels. In a refinement such as this, the electrodes, which are porous electrodes, are connected directly, for flow purposes, to the fuel supply channel and to the oxidant supply channel. The fuel and the oxidant are transported by diffusion in the porous electrodes.

The oxidant supply channel may be in the form of a through-channel in which the oxidant, in particular air, flows. If the fuel cell module is used as a supply unit for a drive apparatus of a vehicle, then it may be expedient for the air to be passed via a suitable flow directly from the environmental atmosphere to the oxidant supply channel. This has the advantage that, while the vehicle is being driven, air is passed to the supply channel without any additional devices being required for this purpose. The supply channel may also be connected via an additional line to a compressor, by which air is introduced into the supply channel. Depending on the vehicle speed, the volumetric flow of the air fed from the compressor to the supply channel can then be reduced. The advantage of this oxidant feed method is that the efficiency can be increased, since the energy consumed by auxiliary units, for example a compressor, is reduced. Feeding the air directly to the oxygen side of the fuel cell module also assists in the cooling of the fuel cell module. The above-mentioned option for feeding air to the fuel cell module may also be implemented in fuel cell modules that are not constructed according to the invention. This also applies to the method for feeding fuel, in particular hydrogen.

The fuel supply channel may be in the form of a closed chamber. The chamber is supplied with the fuel continuously. The amount of fuel, or the volume of fuel, which is fed depends on the pressure in the fuel supply channel. The power density of the fuel cell module can be controlled via the pressure in the fuel supply channel.

If the supply channel is in the form of a chamber, then there is a risk of the concentration of impurities in the fuel supply channel increasing due to impurities in the fuel, in particular in the hydrogen, which may have an adverse effect on the operation of the fuel cell. In order to avoid such an adverse effect, it is proposed that the chamber be purged within specific intervals, which may be dependent on the power emitted from the fuel cell.

During the purging process, the fuel located in the channel is preferably converted via a catalytic converter, before the fuel is emitted to the environment.

A further advantageous refinement of the fuel cell module proposes that the at least two fuel cells have a common electrolyte. This refinement of the fuel cell module has the advantage that production of the module is simplified. Two adjacent fuel cells in each row preferably have a common electrolyte. This makes it relatively simple to replace or exchange a damaged row in a fuel cell module. This improves the maintainability of the fuel cell module.

A further advantageous refinement of the fuel cell module proposes that each row has an essentially meandering upper part and an essentially meandering lower part. An electrolyte is disposed between the upper part and the lower part. The upper part and the lower part have essentially U-shaped holders. The holders in the upper part are open toward a common side. The holders in the lower part are also open toward a common side, with the holders in the lower part being open toward the opposite side. The openings of the holders are preferably open toward the fuel supply channel and the oxidant supply channel, respectively.

According to a further advantageous refinement, the upper part and the lower part each have walls which run essentially transversely with respect to the longitudinal direction of the upper part and the lower part, respectively, and have cut-outs from one end face, in which electrically conductive connecting elements are disposed. The cut-out and at least that section of the connecting element which is located in the cut-out are preferably configured such that the section is aligned with the end face. The connecting element connects electrodes of adjacent fuel cells that are of different polarity.

Yet another advantageous refinement of the fuel cell module proposes that a gas-tight joint is formed between the connecting element and the wall. The upper part and/or the lower part are/is preferably composed of a plastic. The upper part or the lower part may also have a covering wall, which at the same time forms electrical isolation from an adjacent row in the fuel cell module. The connecting elements may also be disposed in the covering wall, so that there is no need for any cut-outs in the walls of the upper part or lower part.

Other features which are considered as characteristic for the invention are set forth in the appended claims.

Although the invention is illustrated and described herein as embodied in a fuel cell module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
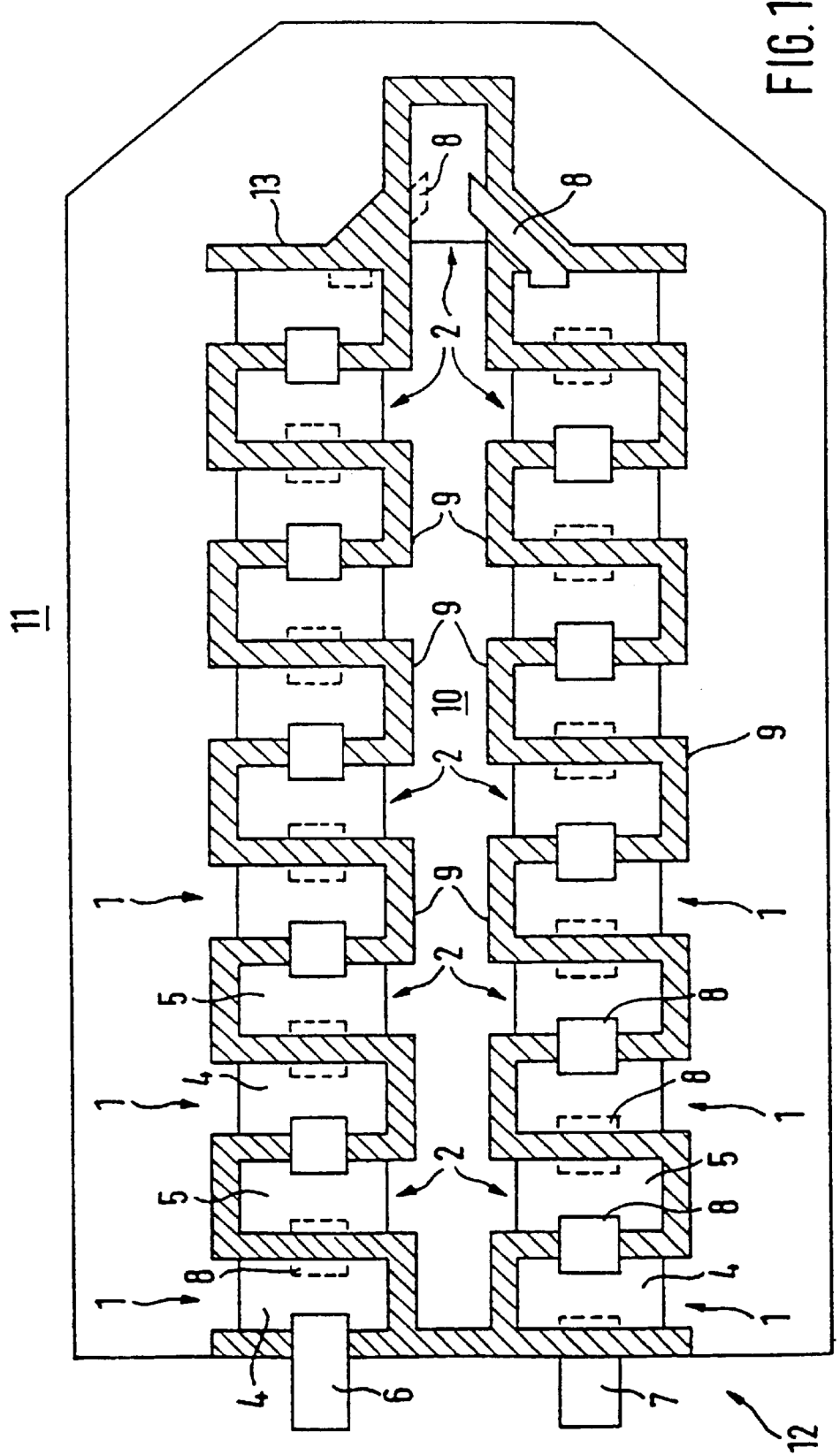
FIG. 1 is a diagrammatic, sectional view of a first exemplary embodiment of a fuel cell module according to the invention.

In all the figures of the drawing, sub-features and integral parts that correspond to one another bear the same reference symbol in each case. Referring now to the figures of the drawing in detail and first, particularly, to FIG. 1 thereof, there is shown a first exemplary embodiment of a fuel cell module. The fuel cell module has fuel cells 1, 2. Each of the fuel cells 1, 2 has two electrodes, one cathode 4 and one anode 5. An electrolyte 3 is disposed between the cathode 4 and the anode 5 of each fuel cell 1, 2, as shown in FIG. 12.

The fuel cell module has a fuel supply channel 10. In the exemplary embodiment illustrated in FIG. 1, the fuel supply channel 10 is configured centrally within the fuel cell module. An oxidant supply channel 11 is provided for supplying the fuel cells 1, 2.

The fuel cells 1, 2 are disposed essentially alongside one another, as can be seen in FIG. 1. The fuel cells 1, 2 are disposed essentially directly alongside one another and form a row 12. The individual fuel cells 1, 2 in the row 12 are connected in series. Connections 6, 7 are provided for electrical connection of the fuel cell module.

The individual fuel cells 1, 2 are connected to one another via connecting elements 8. Starting from the connection 7, the connecting element 8 connects the cathode 4 of the fuel cell 1 to the anode 5 of the fuel cell 2. A further connecting element 8 connects the cathode 4 of the fuel cell 2 to the anode of the adjacent fuel cell 1, and so on as far as the connection 6. The fuel cells 1, 2 are disposed such that the cathode 4, in the view shown in FIG. 1, is followed by the anode 5 of the next fuel cell 2.

Figure 2:
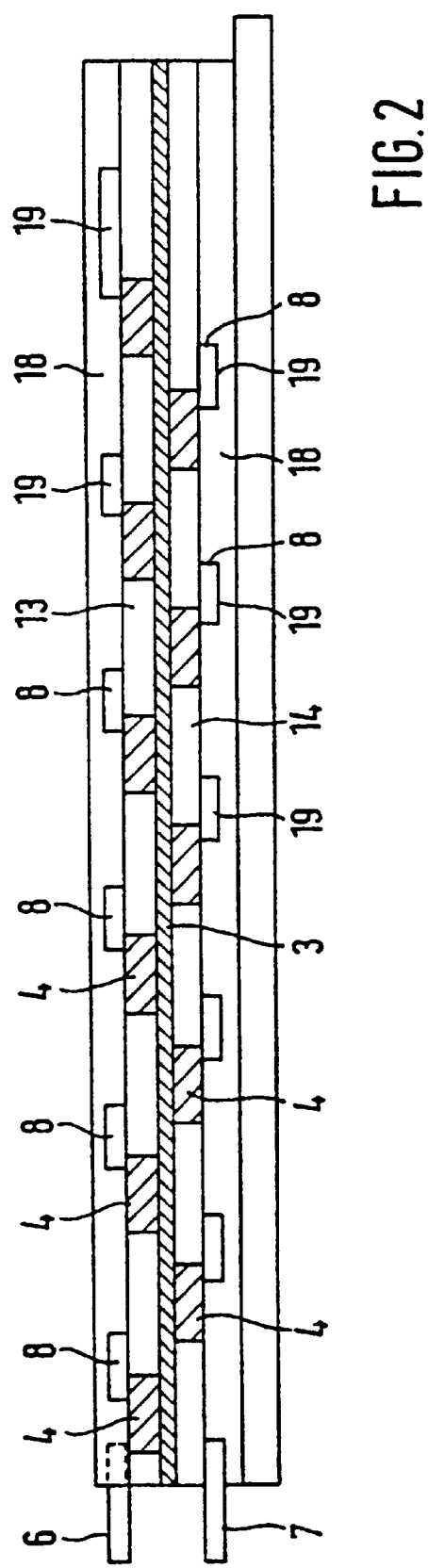
FIG. 2 is a section view of the fuel cell module shown in FIG. 1.

The fuel cells 1, 2 have the common electrolyte 3, as can be seen in FIG. 2. An upper part 13 is disposed on the electrolyte 3. A lower part 14 is disposed underneath the electrolyte 3.

Figure 3:
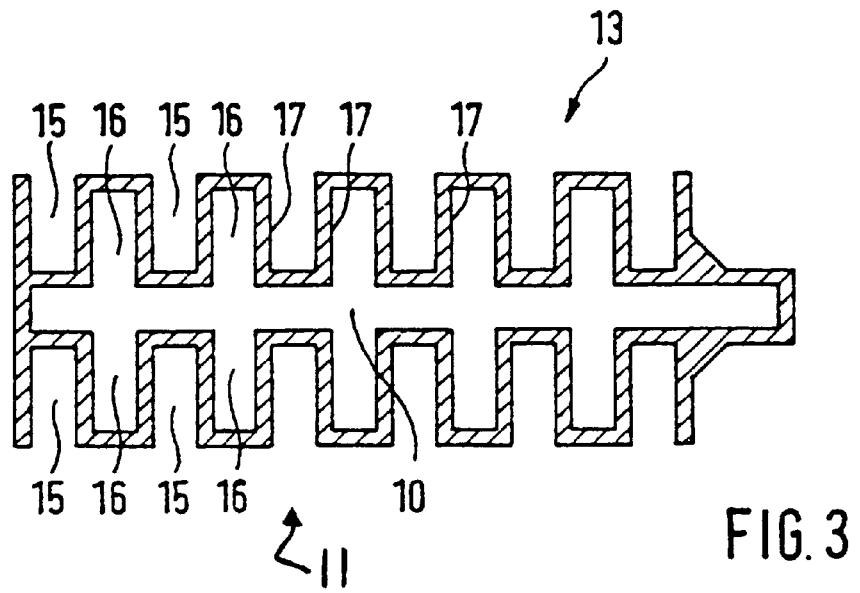
FIG. 3 is a schematic, sectional view of an upper part of the fuel cell module shown in FIG. 1.

The upper part 13 is shown schematically in FIG. 3. The upper part 13 essentially has a meandering shape. It has U-shaped holders 15, 16. The holders 15, 16 are separated from one another by walls 17. The cathodes 4 and anodes 5, respectively, are fitted in the holders 15 and 16, respectively, as can be seen in FIG. 1. By walls 9, the upper part 13 bounds the central fuel supply channel 10. The holders 16 are open toward the fuel supply channel 10. The holders 15 are open toward the oxidant supply channel 11, which is shown only diagrammatically.

Figure 4:
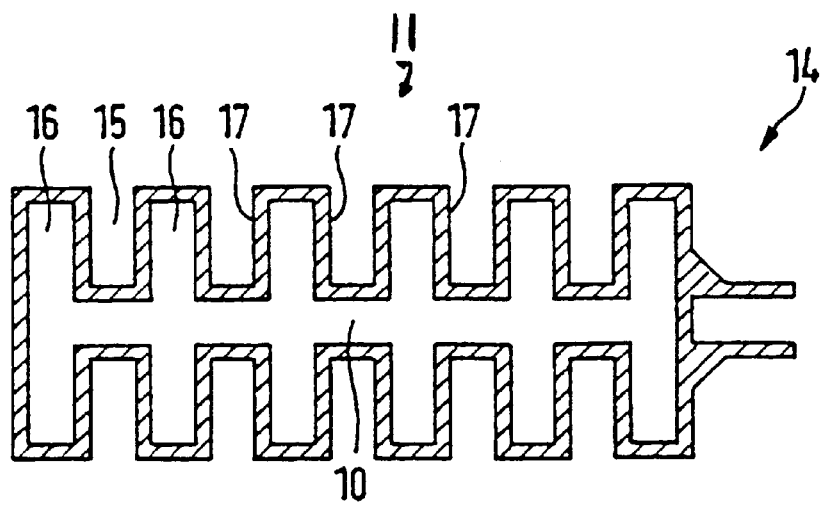
FIG. 4 is a schematic, sectional view of a lower part of the fuel cell module.

FIG. 4 shows the lower part 14. The lower part 14 is configured essentially in a corresponding manner to the upper part 13. When the upper part 13 is disposed on the lower part 14, the walls 17 are located one above the other. The lower part 14 also has a central fuel supply channel 10. The lower part 14 has the holders 15. The holders 15 are open toward the oxidant supply channel 11.

The lower part 14 has the holders 16 that are open toward the fuel supply channel 10. The lower part 14 and the upper part 13 are configured such that, when the upper part 13 is disposed above the lower part 14. The holder 16 which is open toward the fuel supply channel 10 is located underneath the holder 15 in the upper part 13, which is open toward the oxidant supply channel 11. The holder 16 in the upper part which is open toward the fuel supply channel 10 is located above the holder 15 in the lower part 14 which is open toward the oxidant supply channel 11.

A cover 18 (FIG. 2) is provided on the upper part 13 or the lower part 14 and is configured such that it makes available the central fuel supply channel 10 when a number of rows are disposed one above the other. The cover 18 has cut-outs 19, in each of which one of the connecting elements 8 is disposed. Each connecting element 8 connects the cathode 4 of one fuel cell to the anode 5 of another, adjacent fuel cell. As can be seen in FIG. 2, the cathodes 4 are freely accessible, so that an oxidant, in particular air, can be passed by diffusion processes through the porous cathode to the electrolyte. A corresponding situation applies to the possibility of a fuel, in particular hydrogen, being passed to the anode 5. The anode 5 is also porous. The anode 5 is preferably a graphite body. Further catalytic material, for example platinum, can be provided on the anode 5.

Figure 5:
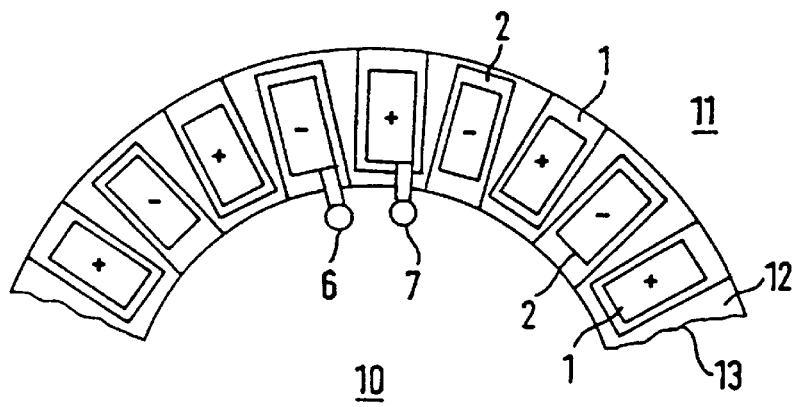
FIG. 5 is a plan view of a second exemplary embodiment of the fuel cell module.
Figure 6:
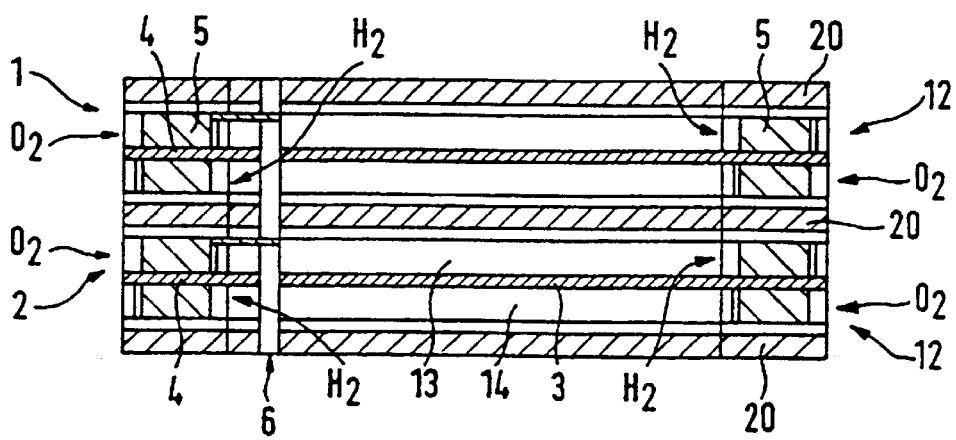
FIG. 6 is a sectional view of the fuel cell module shown in FIG. 5.

FIGS. 5 and 6 show a second exemplary embodiment of a fuel cell module. The fuel cell module has a number of the fuel cells 1, 2 disposed alongside one another. The fuel cells 1, 2 are disposed such that the electrolyte 3 in the fuel cells 1, 2 essentially lies in a common plane. The fuel cells 1, 2 are essentially disposed on a circumference of a circle. The fuel cells 1, 2 that are disposed on the circumference of a circle form a row 12. The row 12 has connections 6, 7 by which a number of rows 12 disposed one above the other can be connected in parallel with one another. The fuel cells 1, 2 are disposed in series. The fuel cells 1, 2 in the row 12 are disposed in the upper part 13 and the lower part 14, which is not shown. The fundamental structure of the upper part and of the lower part corresponds to the structure of the upper part 13 and the lower part 14, respectively, in FIGS. 3 and 4. Once again, the holders 15, 16 are provided, which are disposed on the circumference of a circle.

The rows 12, which are disposed one above the other, form a hollow-cylindrical fuel cell module. As can be seen in FIG. 6, a cooling unit 20 is disposed between two adjacent rows 12, by which heat is dissipated from the fuel cell. The cooling unit 20 is preferably configured such that it at the same time allows moistening of the electrolyte 3. This is particularly advantageous if the electrolyte 3 is a proton-conducting electrolyte membrane. The moistening process is carried out by feeding water to the proton-conducting electrolyte membrane, with the cooling unit 20 having channels that are bounded at least in places by a semi-permeable membrane, through which water can pass. The designations lower part and upper part describe a preferred configuration of the fuel cells. The fuel cells, or at least one row, may also be disposed vertically, or inclined to a vertical.

We claim:

1. A fuel cell module, comprising:
    at least two low-temperature fuel cells, each of said fuel cells having two electrodes of different polarities and an electrolyte disposed between said electrodes, said electrodes of different polarities electrically connected to one another, said fuel cells disposed substantially alongside one another and said electrolyte in each of said fuel cells disposed substantially in a common plane;
    at least one fuel supply channel fluidically communicating with said fuel cells; and
    at least one oxidant supply channel fluidically communicating with said fuel cells.

2. The fuel cell module according to claim 1, wherein said fuel cells are disposed alternately such that said electrodes of different polarities of adjacent fuel cells lie in a plane.

3. The fuel cell module according to claim 1, wherein said fuel cells (1, 2) are disposed alongside one another and form a row.

4. The fuel cell module according to claim 3, wherein said fuel cells form at least two rows of fuel cells.

5. The fuel cell module according to claim 4, wherein said rows of fuel cells are disposed one above another and are electrically isolated from one another.

6. The fuel cell module-according to claim 1, wherein said fuel cells are disposed parallel to one another.

7. The fuel cell module according to claim 1, wherein said fuel cells are disposed substantially on a circumference of a circle.

8. The fuel cell module according to claim 4, wherein said fuel cells are disposed between said fuel supply channel and said oxidant supply channel.

9. The fuel cell module according to claim 1, wherein each of said fuel cells has a fuel feed channel formed therein and an oxidant feed channel formed therein, said fuel feed channel is connected to said fuel supply channel, and said oxidant feed channel is connected to said oxidant supply channel, and said fuel cells are disposed between said fuel supply channel and said oxidant supply channel.

10. The fuel cell module according to claim 8, wherein said at least one fuel supply channel is one of a plurality of fuel supply channels and said at least one oxidant supply channel is one of a plurality of oxidant supply channels, and each of said rows of fuel cells is connected in each case to one of said fuel supply channels and one of said oxidant supply channels.

11. The fuel cell module according to claim 9, wherein said fuel feed channel is formed at a right angle to said fuel supply channel.

12. The fuel cell module according to claim 9, wherein said oxidant feed channel is formed at a right angle to said oxidant supply channel.

13. The fuel cell module according to claim 1, wherein said electrolyte is a common electrolyte for at least two of said fuel cells.

14. The fuel cell module according to claim 3, wherein said electrolyte is a common electrolyte for at least two adjacent ones of said fuel cells in said row.

15. The fuel cell module according to claim 14, wherein said row has a meandering upper part and a meandering lower part and between which said electrolyte is disposed, said upper part and said lower part have substantially U-shaped holders, and said holders in said upper part are open toward a first common side, and said holders in said lower part are open toward a second common, opposite said first common side.

16. The fuel cell module according to claim 15, wherein said upper part and said lower part each have walls which run substantially transversely with respect to a longitudinal direction of said upper part and said lower part, respectively, and said walls have an end face with cut-outs formed therein, and including electrically conductive connecting elements disposed in said cutouts of said walls.

17. The fuel cell module according to claim 16, wherein said cut-outs and at least that section of each of said electrically conductive connecting elements which is located in a respective cut-out are configured such that said section is aligned with said end face.

18. The fuel cell module according to claim 17, wherein a gas-tight joint is formed between each of said electrically conductive connecting elements and a respective wall of said walls.

19. The fuel cell module according to claim 15, wherein at least one of said upper part and said lower part is formed from plastic.

20. The fuel cell module according to claim 15, including at least one cover disposed on one of said upper part and the lower part, said cover having connecting elements by which adjacent ones of said fuel cells are electrically connected to one another.

21. The fuel cell module according to claim 4, wherein said rows of fuel cells are connected in parallel.

22. A fuel cell module, comprising:
    at least two fuel cells disposed substantially alongside one another, each of said fuel cells having two electrodes of different polarities and an electrolyte disposed between said electrodes, said electrolyte in each of said fuel cells being a common electrolyte;
    an electrode of a first polarity of a first of said fuel cells being electrically connected to an electrode of a second polarity of a second of said fuel cells;
    at least one fuel supply channel fluidically communicating with said fuel cells; and
    at least one oxidant supply channel fluidically communicating with said fuel cells.

23. The fuel cell according to claim 22, wherein said electrolyte in each of said fuel cells is disposed is a common plane.

24. The fuel cell according to claim 22, wherein said fuel cells are low-temperature fuel cells.

* * * * *